United States Patent
Kreutzer et al.

(10) Patent No.: US 12,007,003 B2
(45) Date of Patent: Jun. 11, 2024

(54) METHOD FOR PRODUCING A THREADED NUT OF A THREADED DRIVE, IN PARTICULAR A BALL SCREW NUT OF A BALL SCREW DRIVE

(71) Applicant: Schaeffler Technologies AG & Co. KG, Herzogenaurach (DE)

(72) Inventors: Mario Kreutzer, Sonneberg (DE); Dieter Eckert, Fürth (DE); Paul Heinz, Forchheim (DE); Richard Baier, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 82 days.

(21) Appl. No.: 17/628,057

(22) PCT Filed: Jun. 25, 2020

(86) PCT No.: PCT/DE2020/100544
§ 371 (c)(1),
(2) Date: Jan. 18, 2022

(87) PCT Pub. No.: WO2021/018338
PCT Pub. Date: Feb. 4, 2021

(65) Prior Publication Data
US 2022/0275854 A1     Sep. 1, 2022

(30) Foreign Application Priority Data
Aug. 1, 2019  (DE) .................... 10 2019 120 813.0

(51) Int. Cl.
*F16H 25/24* (2006.01)
*B23K 31/02* (2006.01)
(Continued)

(52) U.S. Cl.
CPC ............. *F16H 25/24* (2013.01); *B23K 31/02* (2013.01); *C21D 1/06* (2013.01); *C21D 9/0093* (2013.01);
(Continued)

(58) Field of Classification Search
CPC ...... F16H 25/24; F16H 25/2214; F16H 25/22; F16H 25/2204; F16H 2025/2481;
(Continued)

(56) References Cited

U.S. PATENT DOCUMENTS 2,723,584 A * 11/1955 Parker .................. F16B 37/002
411/437
4,186,620 A    2/1980 Brusasco
(Continued)

FOREIGN PATENT DOCUMENTS

CN        101039017 A    9/2007
DE        2829433 A1     1/1979
(Continued)

OTHER PUBLICATIONS

See Corresponding Search Report for International Application PCT/DE2020/100544.

*Primary Examiner* — Rick K Chang
(74) *Attorney, Agent, or Firm* — Davidson, Davidson & Kappel, LLC

(57) ABSTRACT

A method for producing a threaded nut of a threaded drive, includes the following steps: a sleeve is produced from a steel sheet which is suitable for case-hardening; a rolling profile for a rolling contact with rolling bodies is molded on the inner circumference of the sleeve, said rolling profile being wound in a helical manner about the longitudinal axis of the sleeve; a flange is welded to the end face of the sleeve; the flange is provided with a welding surface on the flange end face facing away from the sleeve for welding to a (Continued)

machine part; the welding surface initially has a diffusion-inhibiting layer which inhibits the penetration of carbon; and the welding surface is exposed by removing the diffusion-inhibiting layer after case-hardening the threaded nut. A threaded nut produced according to the method can be part of a ball screw drive, the flange of which can be welded to a provided machine part by the user.

17 Claims, 2 Drawing Sheets

(51) Int. Cl.
*C21D 1/06* (2006.01)
*C21D 9/00* (2006.01)
*C21D 9/50* (2006.01)
*C23C 8/02* (2006.01)
*C23C 8/22* (2006.01)
*C25D 7/00* (2006.01)
*F16H 25/22* (2006.01)
*C25D 3/38* (2006.01)

(52) U.S. Cl.
CPC .............. *C21D 9/50* (2013.01); *C23C 8/02* (2013.01); *C23C 8/22* (2013.01); *F16H 25/2214* (2013.01); *C25D 3/38* (2013.01); *C25D 7/003* (2013.01)

(58) Field of Classification Search
CPC .... B23K 31/02; B23K 37/00; B23K 37/0426; C21D 1/06; C21D 9/0093; C21D 9/50; C23C 8/02; C23C 8/22; C25D 3/38; C25D 7/003

See application file for complete search history.

(56) References Cited

U.S. PATENT DOCUMENTS

| 4,186,621 | A | 2/1980 | Brusasco |
| 5,954,020 | A | 9/1999 | Schmidt et al. |
| 6,223,971 | B1 | 5/2001 | Sato |
| 6,321,614 | B1 | 11/2001 | Blaurock et al. |
| 6,644,903 | B1 | 11/2003 | Arand |
| 2007/0216277 | A1 | 9/2007 | Yoshida et al. |
| 2017/0299028 | A1 | 10/2017 | Kreutzer et al. |

FOREIGN PATENT DOCUMENTS

| DE | 102008014994 A1 | 9/2009 |
| EP | 0589580 A1 | 3/1994 |
| JP | 2007113611 A | 5/2007 |

* cited by examiner

METHOD FOR PRODUCING A THREADED NUT OF A THREADED DRIVE, IN PARTICULAR A BALL SCREW NUT OF A BALL SCREW DRIVE

CROSS-REFERENCE TO RELATED APPLICATIONS

This application is the U.S. National Phase of PCT Appln. No. PCT/DE2020/100544 filed Jun. 25, 2020, which claims priority to DE 10 2019 120 813.0 filed Aug. 1, 2019, the entire disclosures of which are incorporated by reference herein.

TECHNICAL FIELD

The present disclosure relates to a method for producing a threaded nut of a threaded drive, in particular a ball screw nut of a ball screw drive.

BACKGROUND

A ball screw nut of a ball screw drive according to the features of the preamble of claim 1 has been made known from DE2829433 A1, for example. The sleeve of the ball screw nut formed from a steel sheet is provided on its inner circumference with a ball groove which is wound in a helical manner around the axis of the ball screw drive, and which is rolled in a forming method. The ball screw nut is hardened.

SUMMARY

Steel sheets with a low carbon content are suitable for machining without cutting, although they are often unsuitable for hardening in a heat treatment method. For this reason, such sheet steels are carburized and the screw nut formed from them is case-hardened. In many applications, depending on the application, a fixed connection between the screw nut and a machine part is required. A welded connection is difficult or impossible due to the high carbon content or the martensitic structure.

An object of the present disclosure is to provide a threaded nut of a threaded drive which is easy to produce and, after hardening, easy to connect to a machine part.

A method according to the present disclosure for producing a threaded nut of a threaded drive provides for the following steps.

A sleeve is produced from a steel sheet suitable for case-hardening in a forming method. These sleeves can be seamless and cut to length from pipe material. Steel sheets with a low carbon content are suitable for non-cutting machining.

A rolling profile for the rolling contact with rolling bodies is formed on the inner circumference of the sleeve in a forming method, which is wound in a helical manner around a longitudinal axis of the sleeve. All common forming methods are possible here, such as roller burnishing, high-pressure sheet forming and wobbling.

In the wobbling method, the sleeve is inserted into a die, which is a stationary part of a wobble press. A wobble die is set in a rolling motion, under which the material of the sleeve can flow into its new shape and can generate a thread as a rolling profile, which is wound in a helical manner around a longitudinal axis of the sleeve. In the case of a ball screw drive, this thread is formed by a ball groove wound in a helical manner.

A flange is welded to one end face of the sleeve. Easily weldable steel is used as the material for the flange. On its end face facing away from the sleeve, the flange is provided with a welding surface for welding to a machine part. Depending on the application, this machine part can be, for example, a piston or a housing. Threaded drives produced according to the method of the present disclosure allow simple connection to the machine part by welding the flange with its welding surface to the machine part.

A particular advantage of the present disclosure can be seen in the fact that the wall thicknesses of the flange and the sleeve can differ greatly. Thus, it is possible to provide in an economically favorable manner both a thin-walled case-hardened sleeve and a thick-walled flange suitable for welding to a machine part of the machine in which a threaded drive provided with this threaded nut is used. Thick-walled is to be understood as meaning that the flange is thicker than the wall thickness of the sleeve.

For the further production of the threaded nut, the welding surface is provided with a diffusion-inhibiting layer. The threaded nut thus provided is case hardened. Case-hardening is a method of surface hardening (boundary layer hardening) consisting of carburizing, hardening and tempering a steel workpiece.

The diffusion-inhibiting layer inhibits the penetration of carbon into the welding surface of the flange during carburization.

The flange can be provided with this diffusion-inhibiting layer before welding to the sleeve. For example, it is conceivable to punch or cut end-face coated circular blanks from flat sheets. The flange provided in this manner and the sleeve are aligned with one another. The welding to the sleeve can be carried out through the wall thickness of the flange. The diffusion-inhibiting layer on the end face facing away from the sleeve is melted on during the welding process. Alternatively, the diffusion-inhibiting layer can be applied to the sleeve after the flange has been welded on.

During carburizing of the threaded nut, only those areas without a diffusion-inhibiting layer are carburized. The sleeve does not require a diffusion-inhibiting layer and can be hard inside and out after case-hardening. This means that after case-hardening is complete, those areas that support the diffusion-inhibiting layer remain soft and easily weldable due to the reduced carbon content.

After case-hardening, the welding surface can be exposed by removing the diffusion-inhibiting layer. This exposure of the welding surface can be performed in the course of producing the threaded nut; alternatively, the exposure can be performed when a threaded drive equipped with the threaded nut according to the present disclosure is delivered to a user. In many cases, users weld the flange to an application-specific machine part. Before this welding, the user can remove the diffusion-inhibiting layer at least to the extent that the welding surface is exposed.

If, for example, the end face of the flange facing away from the sleeve is completely covered with this diffusion-inhibiting layer, it may be sufficient to expose only that area on the end face which is intended for welding to the machine part.

Alternatively, the diffusion-inhibiting layer can only be applied to the weld section and, after case-hardening, be removed in the area of the weld surface. This variant reduces the amount of material used.

Welding to the machine part can be performed independently of the production of the threaded nut, i.e., when the threaded nut or a threaded drive comprising this threaded nut is delivered to a user by the producer of the threaded drive, for example, and installed in the intended application.

The diffusion-inhibiting layer can be formed by copper. This layer can be electroplated or plated on. The choice of method depends on the shape of the flange or the semi-finished product from which the flange is produced.

The threaded nut can have an outer sleeve, between which and the sleeve a deflection device known per se is provided for balls which circulate endlessly in a ball track. The ball track has a load section and a deflection section that endlessly connects together a beginning and an end of the load section. The load section is formed by ball grooves of the threaded nut and the threaded spindle that are wound in a helical manner around the spindle axis. The load section may be less than a full turn in the case of what is termed a single deflection and may be formed over several turns in the case of an external deflection. The deflection device can have a plastic sleeve which is inserted coaxially between the sleeve and the outer sleeve. The flange described above extends between the sleeve and the outer sleeve and is firmly connected to the outer sleeve.

BRIEF SUMMARY OF THE DRAWINGS

The present disclosure is explained in more detail below with reference to an exemplary embodiment shown in a total of five figures. In the figures.

DETAILED DESCRIPTION

In all figures, a threaded nut of a screw drive according to the present disclosure is shown in the form of a ball screw nut of a ball screw drive.

Figure 1:
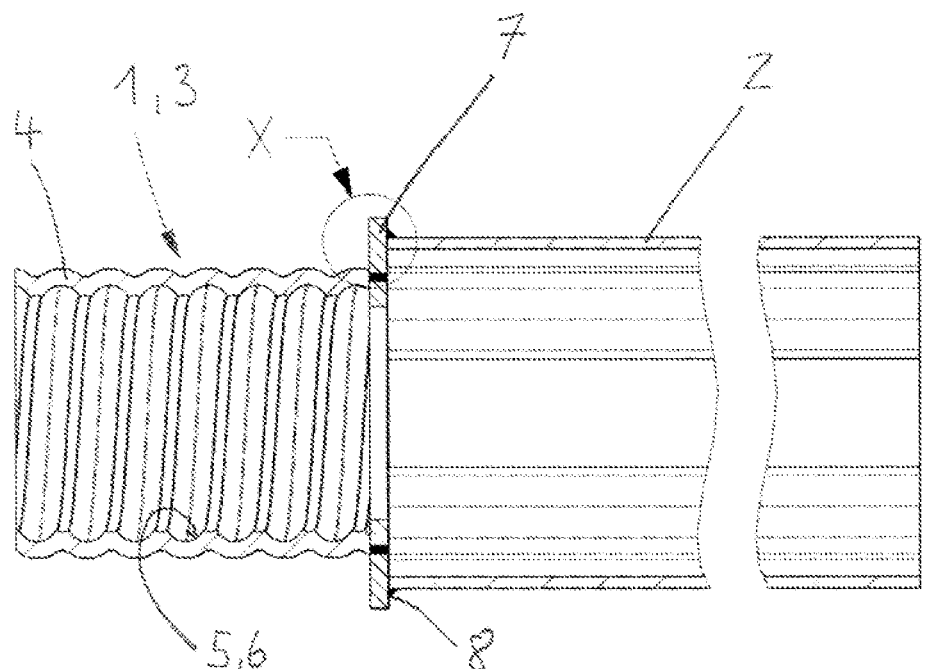
FIG. 1 shows a threaded nut in the form of a ball screw drive in a longitudinal section with a machine part welded on, FIG. 2 shows an enlarged detail from FIG. 1.

FIG. 1 shows a threaded nut 1 of a threaded drive with a machine part 2 welded on in a longitudinal section. This threaded nut 1 is designed as a ball screw nut 3. The ball screw nut 3 has a sleeve 4 made of sheet steel, on the inner circumference of which a rolling profile 5 formed without cutting is configured for rolling contact with rolling elements, not shown. The rolling profile 5 is designed as a ball groove 6 which is wound in a helical manner around a longitudinal axis and on which rolling elements formed by balls, not shown, can roll.

The sleeve 4 is provided at one axial end with a welded-on flange 7, which has a welding surface 8 on its end face facing away from the sleeve 4 for welding on the machine part 2. Furthermore, a weld seam 16 penetrating the wall thickness of the flange 7 can be seen, which connects the flange 7 to the sleeve 4 with a material bond.

Figures 2, 3:
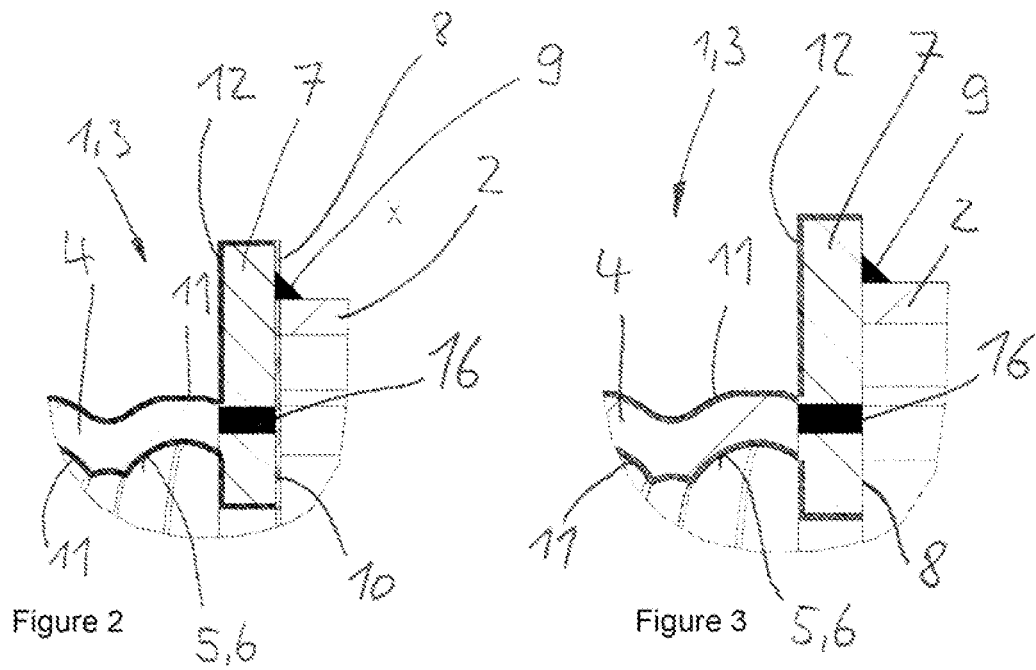
FIG. 3 shows a variant in an enlarged detail as in FIG. 2.

FIG. 2 shows a section of the flange 7 in an enlarged detail. A weld seam 9 is clearly visible, which connects the machine part 2 to the flange 7. On its end face facing the machine part 2, the flange 7 is provided with a diffusion-inhibiting layer 10, which has been removed only in the area of the welding surface 8 to ensure a problem-free material bond between the flange 7 and the machine part 2.

During case-hardening, the threaded nut 1 is carburized. Diffusion of carbon into the welding surface 8 is prevented by the diffusion-inhibiting layer 10, which in the embodiment is formed from copper.

FIG. 2 shows a case-hardening layer 11, 12 of the sleeve 4 and of the flange 7, which is highlighted here by means of a thicker line. These case-hardening layers 11, 12 are the result of case-hardening performed after the flange 7 is welded to the sleeve 4 and before the flange 7 is welded to the machine part 2. The ball groove 6 is case-hardened.

It is clearly shown in FIG. 2 that the case-hardening layers 11, 12 are not formed on the end face of the flange 7 facing the machine part 2. After case-hardening of the threaded nut 1, the diffusion-inhibiting layer 10 is removed only in the area of the welding surface 9 so that it is exposed.

The exemplary embodiment according to FIG. 3 differs from the previously described exemplary embodiment only in that the diffusion-inhibiting layer on the end face of the flange 7 facing the machine part 2 has been completely removed before the threaded nut 1 is welded to the machine part 2.

Figure 4:
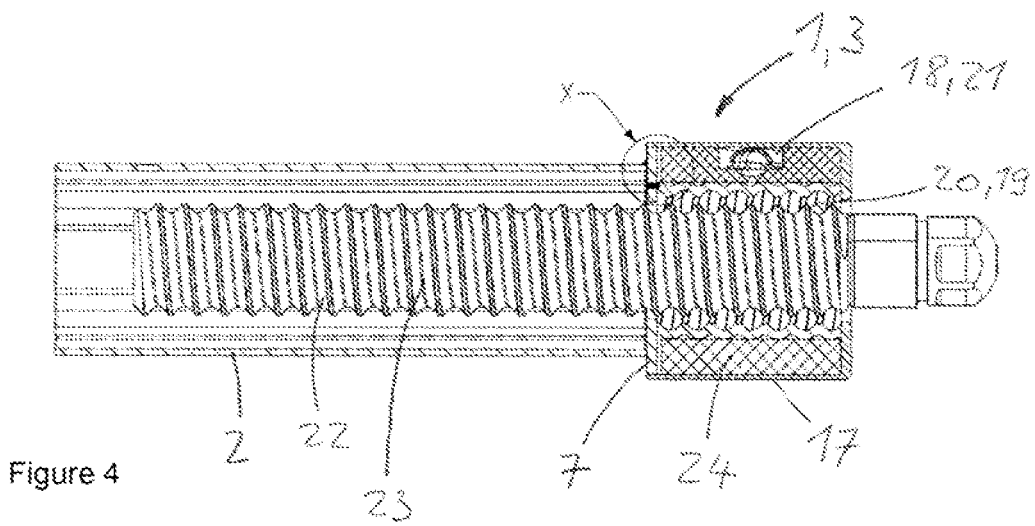
FIG. 4 shows a ball screw drive with a threaded nut according to FIG. 1.
Figure 5:
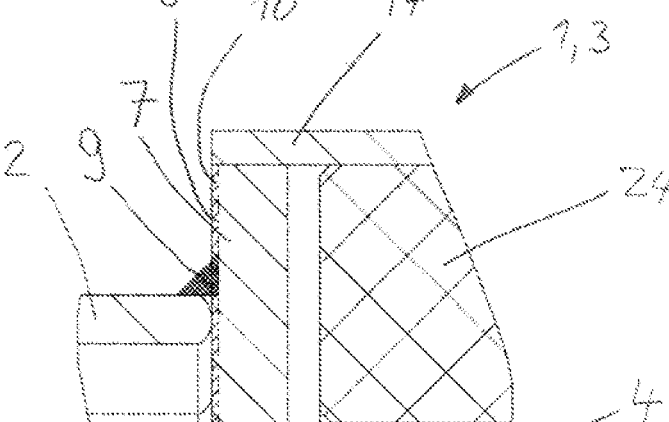
FIG. 5 shows an enlarged detail from FIG. 4.

FIGS. 4 and 5 show a ball screw drive with the threaded nut 1 designed as a ball screw nut 3. The threaded nut 1 has an outer sleeve 17, between which and the sleeve 4 a deflecting device 18 known per se is provided for balls which circulate endlessly in a ball track 19. The ball track 19 has a load section 20 and a deflection section 21 that endlessly connects together a beginning and an end of the load section 20. The load section 20 is formed by ball grooves 14, 22 of the threaded nut 1 and the threaded spindle 23 that are wound in a helical manner around the spindle axis. In the exemplary embodiment, the threaded spindle 23 is rotationally driven. In this exemplary embodiment, the load section 20 extends over several turns. The deflection device 18 has a plastic sleeve 24 which is inserted coaxially between the sleeve 4 and the outer sleeve 17. The flange 7 described above extends radially between the sleeve 4 and the outer sleeve 17 and is firmly connected to the outer sleeve 17.

REFERENCE SIGNS

1 Threaded nut
2 Machine part
3 Ball screw nut
4 Sleeve
5 Rolling profile
6 Ball groove
7 Flange
8 Welding surface
9 Weld seam
10 Layer
11 Case-hardening layer
12 Case-hardening layer
13 Threaded spindle
14 Ball groove
15 Ball
16 Weld seam
17 Outer sleeve
18 Deflection device
19 Ball track
20 Load section
21 Deflection section
22 Ball groove
23 Threaded spindle
24 Plastic sleeve

The invention claimed is:

1. A method for producing a threaded nut of a threaded drive, having the following steps:
   providing a sleeve produced from a steel sheet;
   molding a rolling profile for a rolling contact with rolling bodies on an inner circumference of the sleeve, said rolling profile being wound in a helical manner about a longitudinal axis of the sleeve;
   welding a flange to an end face of the sleeve to form the threaded nut,
   the flange including a welding surface on a flange end face facing away from the sleeve for welding to a machine part,
   the welding surface initially having a diffusion-inhibiting layer which inhibits a penetration of carbon into the welding surface; and
   case-hardening the threaded nut.

2. The method according to claim 1, further comprising, after the case-hardening of the threaded nut, exposing the welding surface by removing the diffusion-inhibiting layer.

3. The method according to claim 2, further comprising providing the flange, after being welded to the sleeve and before the case-hardening of the threaded nut, with the diffusion-inhibiting layer on the flange end face facing away from the sleeve, which is removed after the case-hardening at least in an area of the welding surface.

4. The method according to claim 1, wherein the diffusion-inhibiting layer is formed by copper.

5. The method according to claim 1, wherein the diffusion-inhibiting layer is electroplated or plated thereon.

6. A threaded nut, produced according the method of claim 1, the threaded nut being a ball screw nut of a ball screw drive, the ball screw nut including a ball groove formed by the rolling profile.

7. A ball screw drive comprising:
   a threaded spindle;
   the threaded nut according to claim 6 arranged on the threaded spindle; and
   balls attached to the ball groove of the threaded nut which roll off the threaded spindle.

8. The method according to claim 1, wherein the case-hardening includes carburizing the inner circumference and an outer circumference of the sleeve and a portion of the flange, the diffusion-inhibiting layer preventing carburizing of the flange end face.

9. The method according to claim 1, wherein the molding of the rolling profile including roller burnishing, high-pressure sheet forming or wobbling.

10. The method according to claim 1, wherein the welding of the flange to the end face of the sleeve includes forming a weld seam penetrating a wall thickness of the flange to connect the flange to the sleeve with a material bond.

11. A method of producing a ball screw drive comprising:
   performing the method according to claim 1; and
   fixing the machine part to an area of the flange end face at which the diffusion-inhibiting layer was removed.

12. A threaded nut comprising:
   a steel sleeve including a rolling profile for a rolling contact with rolling bodies on an inner circumference of the sleeve, the rolling profile having a helical shape extending about a longitudinal axis of the sleeve;
   a flange joined to an end face of the sleeve, the flange including a flange end face facing away from the sleeve for joining to a machine part, a portion of the flange end face including a diffusion-inhibiting layer configured for inhibiting carbon from penetrating into the flange end face, the steel sleeve and the flange being covered by a case-hardening layer formed by diffusion of carbon except in the flange end face.

13. The threaded nut as recited in claim 12 further comprising a weld seam penetrating a wall thickness of the flange to connect the flange to the sleeve with a material bond.

14. The threaded nut as recited in claim 12 wherein a wall thickness of the flange is greater than a wall thickness of the sleeve.

15. A ball screw drive comprising:
   a threaded spindle; and
   the threaded nut according to claim 14 arranged on the threaded spindle.

16. The ball screw drive as recited in claim 15 further comprising the machine part fixed to a portion of the flange end face not including the diffusion-inhibiting layer configured.

17. The ball screw drive as recited in claim 15 wherein the machine part is fixed to the portion of the flange end face not including the diffusion-inhibiting layer configured by a weld seam.

* * * * *